Aug. 4, 1959  R. C. GUNTER, JR., ET AL  2,897,722
MEANS AND METHOD OF TESTING LENSES
Filed Nov. 27, 1953  6 Sheets-Sheet 1

INVENTORS
ROY C. GUNTER, JR.
DONALD B. WHITNEY
ROBERT E. HAYNES
BY
Louis L. Gagnon
ATTORNEY Aug. 4, 1959   R. C. GUNTER, JR., ET AL   2,897,722
MEANS AND METHOD OF TESTING LENSES
Filed Nov. 27, 1953   6 Sheets-Sheet 2

INVENTORS
ROY C. GUNTER, JR.
DONALD B. WHITNEY
BY ROBERT E. HAYNES

Louis L. Gagnon
ATTORNEY

INVENTORS
ROY C. GUNTER, JR.
DONALD B. WHITNEY
ROBERT E. HAYNES
BY Louis L. Gagnon
ATTORNEY Aug. 4, 1959    R. C. GUNTER, JR., ET AL    2,897,722
MEANS AND METHOD OF TESTING LENSES
Filed Nov. 27, 1953    6 Sheets-Sheet 4

INVENTORS
ROY C. GUNTER, JR.
DONALD B. WHITNEY
BY ROBERT E. HAYNES

Louis L. Gagnon
ATTORNEY

United States Patent Office 2,897,722
Patented Aug. 4, 1959

2,897,722

MEANS AND METHOD OF TESTING LENSES

Roy C. Gunter, Jr., Dodge, Donald B. Whitney, Southbridge, and Robert E. Haynes, Sturbridge, Mass., assignors to American Optical Company, Southbridge, Mass., a voluntary association of Massachusetts Application November 27, 1953, Serial No. 394,546

8 Claims. (Cl. 88—56)

This invention relates to means and method of testing lenses to determine the optical characteristics thereof and has particular reference to novel apparatus embodying a combination of optical, electrical, and mechanical devices for testing individual lenses or combinations of lenses to determine the focal powers thereof, and method of performing such tests.

One of the primary objects of this invention is the provision of novel means and method of testing lenses for determining the optical characteristics thereof such as overall spherical power or meridional power.

Another object is to provide novel means and method of determining optical characteristics such as the focal power of an optical system by electronically analyzing the spatial frequency or intensity characteristic response of the optical system as indicated by an infinite number of electrical waves, which waves are formed by directing a variable light flux through said optical system to a photosensitive device.

Another object is to determine optical characteristics such as the focal power of a lens under test by directing through the lens a variable light flux to form an image at a known receiving point, electronically analyzing the image to record the varying focal characteristics of the image as influenced by the variation in the light flux, and translating the analysis into a visible record indicating the focal power of the lens under test.

Another object is to provide a lens testing device comprising means for directing a light beam through a lens under test, means for modulating the light beam, electronic means for receiving the modulated light beam as altered by the lens under test and converting it to electrical waves of frequencies controlled by said modulating means, and means for analyzing said waves and transmitting the analysis to co-operative operating means for indicating the analysis in terms of optical characteristics such as focal power of the lens under test.

A further object is to provide a lens testing device comprising an optical system for projecting a light beam, and a target for modulating the light beam, the lens to be tested being disposed in the light beam for focusing the resultant variable image of the target to a remote point, electronic analyzing means comprising a photosensitive device for receiving the variable image of the target as altered by the lens under test and converting it into electrical waves, electronic means for analyzing the waves and transmitting the analysis to operating means for adjusting the photosensitive device and lens under test with respect to each other and for visually recording the amount of adjustment in terms indicating the focal power of the lens under test.

Another object is to provide a novel method of determining optical characteristics of a lens comprising optically aligning a source of illumination with a photosensitive device whereby a lens to be tested may be positioned intermediate thereof, modulating the light as received by the photosensitive device whereby it will have temporal intensity characteristics embodying, as a factor thereof, the optical characteristics of the lens under test, the photosensitive device functioning to convert said temporal intensity characteristics of the light into an electric signal having temporal amplitude characteristics, and interpreting from the temporal amplitude characteristics of the signal the effect which the optical characteristics of the lens under test has on the temporal intensity characteristics of the light as received by the photosensitive device, and apparatus for performing such a test.

A still further object is to provide a device of the above character wherein the electronic analyzing means comprises a cathode follower amplifier which picks up the electrical wave signal from the photosensitive device, lowers the impedance thereof, and sends it to a two-stage amplifier which functions to send an amplified wave signal to a band pass filter where each individual wave of the signal is split into leading edge and trailing edge pulses corresponding to the leading and trailing sides of the respective waves, the leading edge pulses being of positive polarity and the trailing edge pulses of negative polarity, or inversely, the resultant wave consisting of positive and negative pulses then being separated by a paraphase amplifier unit into two separate signals, one of which is the opposite polarity of the other, the positive pulses of one of the separate signals corresponding to the trailing sides of the initial pulses and the positive pulses of the other separate signal corresponding to the leading sides of the initial pulses, the positive and negative pulses of the respective separate signals being separated from one another by pulse clipper circuits and amplified, and transmitted to respective peak voltmeter circuit units which transmit all the pulses of one polarity of both signals to a difference amplifier which in turn transmits the differences therebetween, if any, to a balancing system which adjusts the device in accordance with said differences to indicate the focal power of the lens under test.

Another object is to provide apparatus of the above character which will determine the focal characteristics of lenses regardless of their light transmission characteristics.

A still further object of the invention is to provide a device for automatically determining the focal power of an article such as a lens, which device will perform its function efficiently and fast without requiring skill on the part of an operator or labor such as is involved in performing such tests by conventional methods.

Other objects and advantages of the invention will become apparent from the following description taken in connection with the accompanying drawings in which.

The basic principle on which an instrument embodying the present invention operates is that an optical system may be characterized by what we call its "spatial" frequency response or spatial intensity characteristics as modified by said response in much the same way as an electric network may be characterized by its "temporal" frequency response or its temporal amplitude characteristics as modified by said response. By temporal frequencies, we mean a periodic variation in energy with respect to time. By spatial frequency we mean the periodic variation of energy with respect to space. In an electrical network the incoming signal may be shown by analysis to be made up of an infinite number of sine waves whose frequencies are harmonically related. In an optical system an incoming signal, which consists of a variation of light flux with viewing angle, or spatial variation of light flux may also be analyzed and shown to consist of sine waves having their frequencies harmonically related. With the advent of photomultiplier tubes, it has been found that the ready evaluation of "fuzzy" images can be easily accomplished and, therefore, makes sine wave testing of optical systems practical. Such optical sine wave testing consists of using targets whose density varies sinusoidally. The examination of the image is effected by placing in front of a photomultiplier an aperture of a diameter less than the highest frequency being used for focussing purposes and scanning the image therewith. Since all periodic targets may be readily shown by analysis to be made up of sine waves, it has been found that by testing an optical system with a number of sine wave targets of different spatial frequency, it is possible to predict what the response of the system will be to a square, triangular, or any other periodic target. This applies also to random targets. In accordance with the present invention, we find that it is possible to utilize the curves of such electrical or sine waves to arrive at a figure of merit for a particular optical system under test, that is, to obtain a physical definition of "best focus." Accordingly "best focus" is hereby defined as the point in image space at which the frequency response is optimum for the band width of information in which the observer is interested.

One successful device embodying this invention is shown in the attached drawings and embodies an optical system for directing light onto a photomultiplier and a target "in depth" for modulating the light and thereby forming an electronic wave signal comprised of square waves emitted by the photomultiplier.

Figures 1, 4:
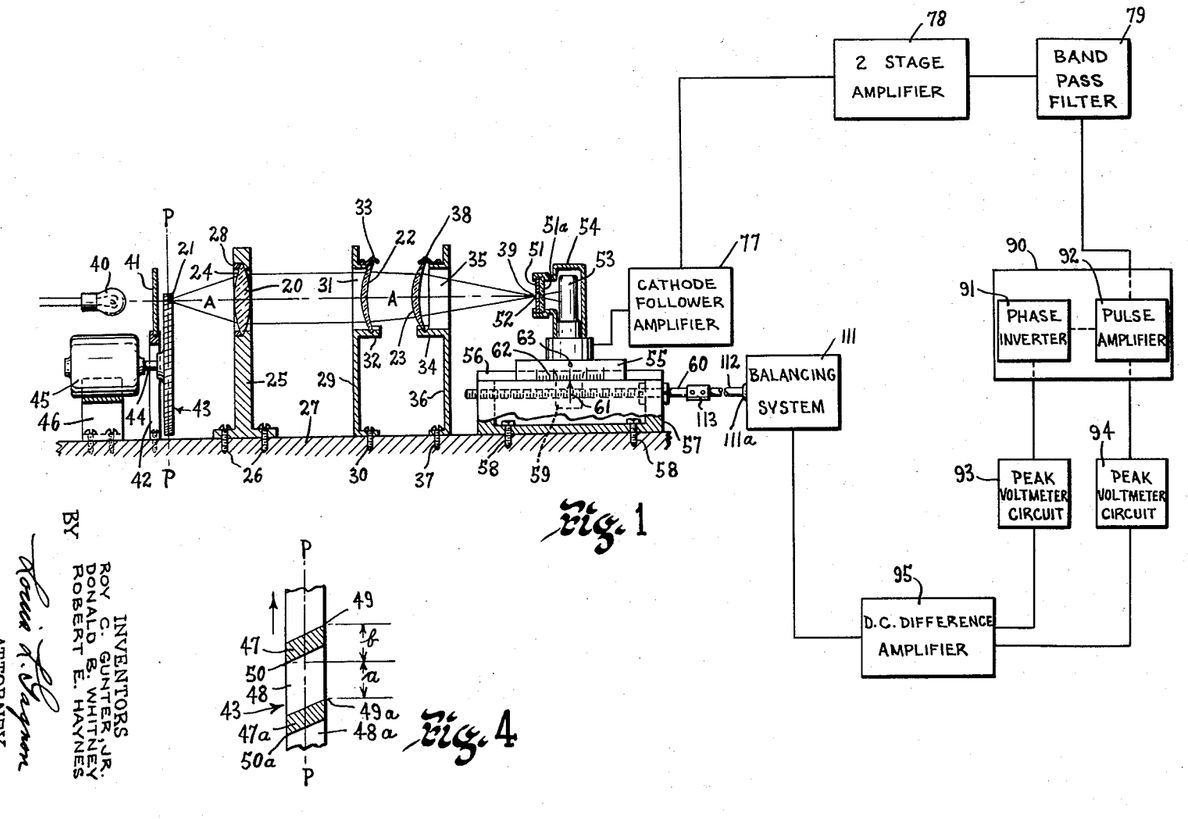
Fig. 1 is a diagrammatic view of a system embodying the present invention.
Fig. 4 is an enlarged fragmentary view of a portion of the periphery of the target shown in Fig. 2.

The optical system comprises a collimator lens 20 which picks up light from an object point 21 and transmits it as effectively parallel rays to a compensating lens 22 which directs the rays to a lens 23 under test. The collimator lens 20 may be securely mounted in an opening 24 in an upright 25 which is relatively fixedly secured as by screws 26 or the like to a suitable base or support 27, the lens 20 being held in the opening 24 by any suitable means such as a retaining ring 28.

The compensating lens 22 is held in optical alignment with the collimator lens 20 as by a standard 29 which is screwed as at 30 or otherwise secured to the support 27, the compensating lens 22 being located within an opening 31 in the standard 29 and supported by a grooved ledge 32 on the standard 29 adjacent the lower edge of the opening 31, the lens 22 being held in place as by a spring clip 33 carried by the standard and which engages the upper edge of the lens 22. The lens 23 under test is similarly supported in optical alignment with lenses 20 and 22 as by a grooved ledge 34 formed adjacent the lower edge of an opening 35 through a standard 36 screwed or otherwise attached to the support 27 as at 37, the lens 23 being retained in position as by a spring clip 38 similar to the spring clip 33. By so mounting the compensating lens 22 and lens 23 under test, these lenses may be easily removed from and inserted in the optical system by manually applying force thereto of a sufficiency to overcome the inherent resiliency of the spring clips 33 and 38. The relative spacing between the collimator lens 20 and the effective object point 21 is critical since the focal point of the collimator lens 20 must always coincide with the point 21. This is to cause the rays directed toward the lens under test to be effectively parallel and in effect coming from infinity whereby the focussing of said rays at a given point will result mainly from the true focal power of the lens 23 under test.

The present device measures the focal power of a lens under test to extremely small fractions of a diopter and is arranged to indicate visually whether or not the lens has a focal power within predetermined tolerances of a given amount. The device is designed to operate at an optimum image point 39 which is equivalent to the focal point of a +3.00 diopter lens. It is found that with this arrangement the ultimate size of the device can be held within tolerable limits. Therefore when testing a +3.00 diopter lens, the lens is axially positioned to intercept the parallel rays emitted by the lens 20, and the rays, if said lens is of the desired accurate power, will converge to the image point 39 of the device. If, however, it is desired to measure the power of a +4.00 diopter lens and by reason of the fact that the rays emanating from the collimator lens 20 are effectively parallel, a compensating lens 22 of a minus power and of a value equal to approximately the difference between the +3.00 diopter for which the device is designed and the +4.00 diopter of the lens to be tested, namely, approximately −1.00 diopter, is positioned intermediate the collimator lens 20 and the lens 23 to be tested. This compensating lens 22, because of the fact that the rays emanating from the lens 20 are effectively parallel, may be located at any desired position with respect to said collimator lens 20 but it must be located with respect to the lens under test at a position whereby its optical value combined with said lens under test will be approximately the +3.00 diopter for which the device is designed. If we are to test a lens of a different dioptric power, for example, a +5.00, we would use a compensating lens of approximately −2.00 diopter. This is to cause the rays as effected by the combined values of the compensating lens and the test lens to focus at the principal image point 39 for which the device is designed. Of course, if the lens under test is not of the true value and the image point resulting therefrom is such that the light rays do not focus at point 39 or at a tolerable relation therewith then the device would immediately detect this difference.

The image point 39 is optically aligned with the axis A—A of the system and the lens 23 under test is preferably axially aligned therewith. The effective object point 21 is illuminated by means such as a suitable lamp 40, the light therefrom being diffused by a diffusing plate 41 supported between the lamp 40 and object point 21 by means such as a standard 42 mounted on the base 27.

Figure 2:
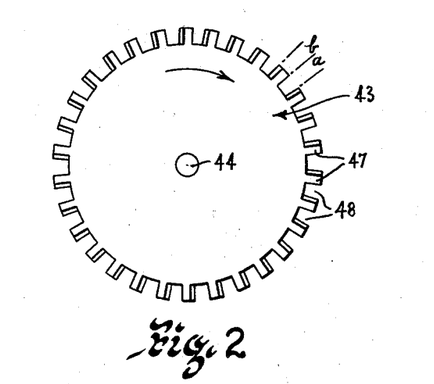
Fig. 2 is a front elevational view of one type of target suitable for use with the present invention.
Figure 3:
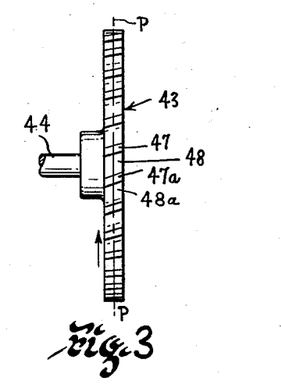
Fig. 3 is a side elevational view of the target shown in Fig. 2.

Inserted between the diffusing plate 41 and collimator lens 20 is a target 43 which is mounted on a shaft 44 for rotation by a motor 45, the motor 45 being mounted as by a motor bracket 46 on the support 27. It has been found that simple linear sine targets effected by modulating variable density sound tracks on film with constant amplitude sine waves may be used, as well as radial or linear square wave targets, and radial or linear sine targets with their densities varying sinusoidally at fixed radii. Target 43 is a radial square wave target (Figs. 2 and 3) which comprises a disc or wheel formed of metal or other relatively rigid material having a series of alternately spaced occluders and openings 47 and 48 respectively arranged at predetermined spaced intervals throughout its periphery. The occluders 47, however, are angled with respect to the plane of the target and are preferably spaced so that when viewed in elevation the areas of occlusion will be substantially equal in width to the open spaces. This is illustrated in Fig. 4 wherein it is apparent that the distance "b" between a leading edge 49 of an occluder 47 and the trailing edge 50 thereof is substantially equal to the open spacing "a" between the trailing edge 50 of the occluder 47 and the leading edge 49a of the next adjacent occluder 47a. With such substantially equal spacing the electrical wave signal to be formed by the electronic means will be comprised of substantially equally spaced waves.

The target 43 is so positioned in the optical system that a plane P—P extending through the target substantially midway between the opposed parallel sides or surfaces thereof will always pass through the effective or optimum object point 21 as the target is rotated.

The target 43 is also aligned substantially perpendicular to the axis A—A of the optical system and in such relation thereto that when the target is rotated the occluders 47 and openings 48 therebetween will pass through the axis A—A and will alternately permit passage and cut off passage of the light beam which projects the image of the object point 21 to the image point 39 thereby producing a variable light flux. Thus, the image point 39 will intermittently receive the projected image at substantially equally spaced intervals.

The target 43 in the present device is provided with thirty occluders and the speed of rotation of said target is approximately 1725 r.p.m. The number of occluders and speed of rotation may be varied, however, it being only essential to remain within limits which will provide a usable modulation of light beam.

In accordance with the present invention a scanning aperture 52 is adapted to be positioned at or adjacent to the image point 39. The scanning aperture 52 should preferably be of a diameter smaller than the image occasioned by the highest frequency being used for focussing purposes and is shown in the drawings as a pinhole 52 provided in an opaque member 51 located between a photomultiplier 53 and the lens under test, the aperture 52 being positioned on the optical axis A—A. A diffusing plate 51a is positioned between the aperture 52 and photomultiplier 53 to diffuse the light striking the photomultiplier. The photomultiplier 53 thus picks up the diffused light entering through the aperture 52, which light impinges intermittently thereupon when the target 43 is being rotated by motor 45.

It is to be understood here that the photomultiplier, or other similar photosensitive device to be used, is adapted to function in response to variations in intensity of the light impinging thereupon. Thus, it is apparent that a variable density target or target having equally spaced and dimensioned opaque and transparent portions within a given distance, such as target 43, will vary the intensity of the light in such manner as to introduce spatial intensity characteristics therein and as received by the photomultiplier and when the target is rotated or otherwise scanned will thus also impart temporal intensity characteristics thereto. The effect upon the light of the related positions of the lens, aperture and target as modified by the focal power of the lens under test; that is, the combined effect of the related spacings of the lens 23, aperture 52, and target 43 with the effect upon the light of the focal power of the lens 23 (its spatial frequency response) and of the rotation and variation in density of the target, will cause the light as received by the photomultiplier to have determinable temporal intensity characteristics.

The aperture 52 is adapted to be moved by electromechanical means to be disclosed hereinafter so that it will be positioned at the image or focal point 39 of the particular lens being tested. That is, if a lens under test is provided with focal power somewhat greater than desired, the focal point thereof will then be spaced with respect to the optimum focal point 39 on axis A—A nearer the effective object point 21, and the opposite will hold true for a lens under test which has focal power somewhat less than desired. The mechanical means for adjusting the aperture 52 includes a support 55 on which the photomultiplier 53 and casing 54 carrying the apertured opaque member 51 and diffuser 51a are relatively fixedly mounted. The support 55 is slidable in a direction parallel with optical axis A—A on slideways 56 formed on the surface of a base 57 which is bolted or otherwise secured as at 58 to the support 27. The support 55 has an integral block portion 59 extending downwardly therefrom into the interior of the base 57. A threaded drive shaft 60 is rotatably mounted in the ends of the base 57 and threadedly engages the block 59 in such a manner that when the shaft 60 is rotated it will, through block 59, drive the support 55 forward or backward on the slideways 56 and thus move the aperture 52 longitudinally along the optical axis A—A.

An arrow 61 or similar indicator is provided on the side of the base 57 and is adapted to function co-operatively with a scale 62 on support 55 to indicate the extent of movement of the aperture 52. The scale 62 in the present instance is calibrated in turns of 100th of a diopter but have other calibrations if desired. The scale 62 is shown in Fig. 1 with its zero graduation 63 aligned with the arrow 61, indicating that the aperture 52 is at the focal point of the lens 23 under test. If the lens 23 had a focal power greater than desired, its focal point would be located nearer the lens and thus the aperture 52 would be adjusted to a location where the scale 62 would indicate the amount of dioptric power that the lens possessed in excess of the amount desired.

The electronic mechanism for controlling the movement of the aperture 52 is adapted to operate in response to the spatial frequency of the optical system as affected by the lens under test. At this point it is to be understood that the effective object point 21 is an "optimum" point lying on plane P—P and the image point 39 is an "optimum" point indicating correct focus of the object point 21 by an accurately formed lens 23 or combination of lenses having a +3.00 diopter value. Therefore, assuming that a beam of light is made to pass through one of the openings 48 in the target 43, as the target 43 is rotated in the direction indicated by the arrows, it is apparent that as a trailing edge 50 passes across axis A—A the beam will immediately project an image of trailing edge 50 to a point adjacent image point 39 and the photomultiplier 53 will start to function. The terms "trailing edge" and "leading edge" are used herein to denote the edges of the occluders which cross the axis A—A immediately before and after an opening 48 crosses the axis. As the leading edge 49a of the occluder 47a crosses axis A—A or aperture 52 the beam of light will be partially blocked off and when the center of the next occluder 47a crosses the axis A—A all of the light will be blocked and the photomultiplier 53 will then cease to function.

Figure 7:
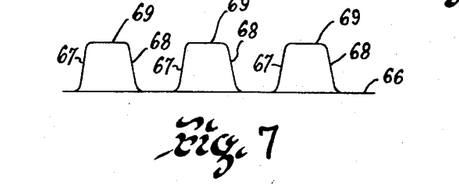
Fig. 7 is a wave form as produced by the device when the optical system is in properly focused condition.

Passage of a succession of occluders and openings 48 across the axis A—A and the aperture 52, because of the straight leading and trailing edges of the occluder will cause the photomultiplier 53 to intermittently operate to form a wave signal of electric energy comprised of a series of substantially "square" waves. Such a square wave signal is shown in Fig. 7 as seen on an oscillograph screen.

Figure 5:
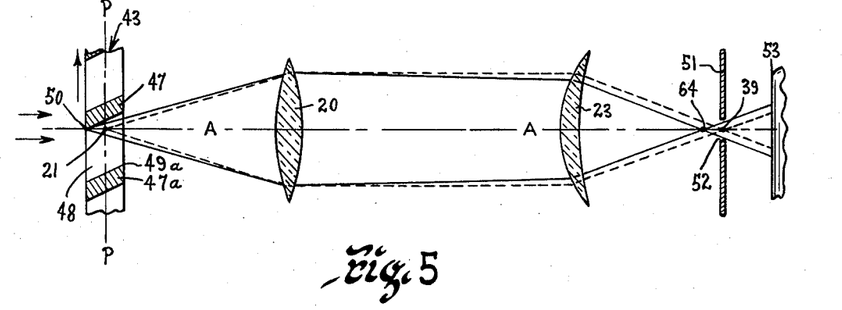
Figs. 5 and 6 are diagrammatic views of the optical system of the invention showing the system in properly focused condition, both figures pertaining to the same focal setting of the lens under test.
Figure 6:
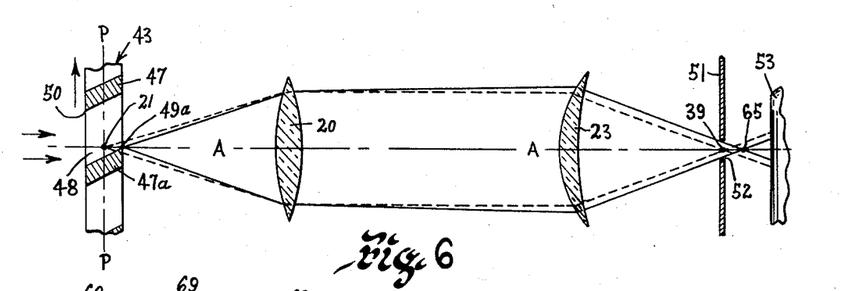

However, it is apparent that the trailing edge 50 of each occluder is displaced to one side of the optimum object point 21 and of plane P—P while the leading edge 49a is similarly displaced to the other side thereof. Thus, the images of the trailing edge 50 and leading edge 49a will accordingly be focussed at opposite sides of the optimum image point 39. This is illustrated in Figs. 5 and 6 wherein Fig. 5 illustrates the focussing of the trailing edge 50 at image point 64 while Fig. 6 illustrates the focussing of the leading edge 49a at image point 65, both of which image points 64 and 65 are on axis A—A and are equally spaced on opposite sides of optimum image point 39. Thus, these edges 50 and 49a, being slightly spaced from the optimum object point 21, will be received by the photomultiplier as so-called "fuzzy" images, that is, the intensity of the light at the photomultiplier will be varied. The resulting effect upon the signal 66 shown in Fig. 7 will be that the leading and trailing sides 67 and 68, respectively, of each wave 69 will be at a sloping angle rather than perpendicular to the base or zero line of the signal, the leading and trailing sides 67—68 corresponding, of course, to the respective trailing and leading edges 50—49a of the target.

Figure 8:
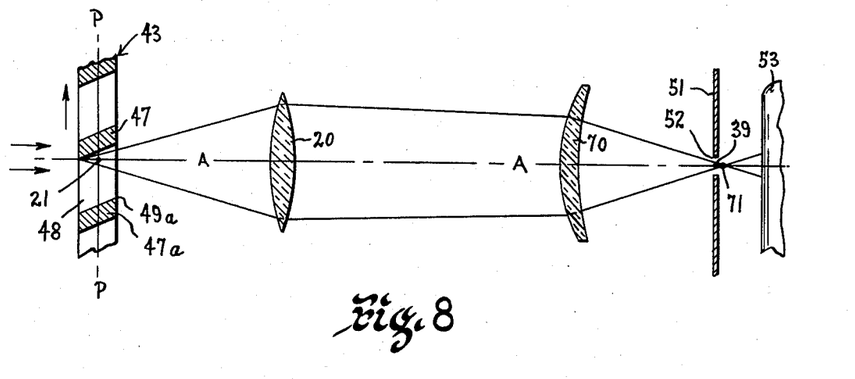
Figs. 8 and 9 are diagrammatic views of the optical system of the present invention illustrating a lens under test in an improperly focused condition, both figures pertaining to the same focal setting of the lens under test.
Figure 9:
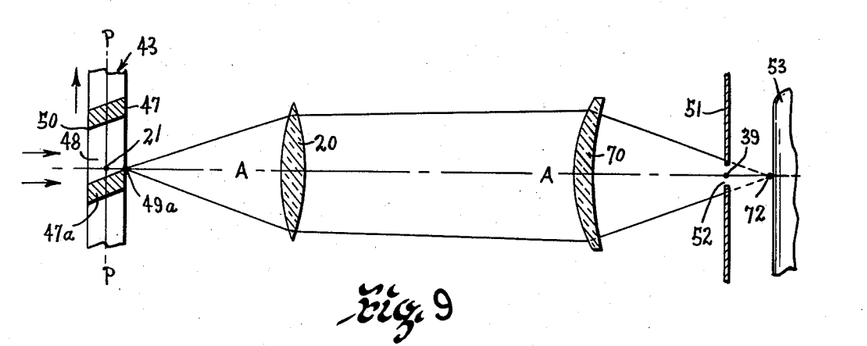
Figure 10:
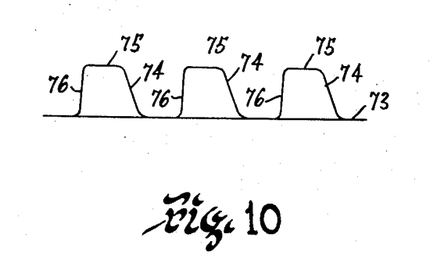
Fig. 10 is a modified wave form produced by an improperly focused optical system.

Figs. 8 and 9 illustrate a system wherein a lens 70 under test has a focal power slightly less than that for which the device is set to measure. The image of the leading edge 50 will in this case be focussed at image point 71 (Fig. 8) while the image of trailing edge 49a will be focussed at image point 72 (Fig. 9). The resultant electrical signal 73 will be formed by the photomultiplier 53 as shown in Fig. 10. Since in this case the image point 72, which is the focal point of trailing edge 49a, is farther away from the optimum image point 39 than is image point 71, which is the focal point of the leading edge 50, the trailing sides 74 of the waves 75 will slope to a greater degree than the leading sides 76 of the waves 75. When the aperture 52 is located at the focal point of the lens under test, the focal power of the lens 23 will cause focal points 71—72 (Figs. 8 and 9) to be spaced at substantially equal distances on opposite sides of the optimum focal point 39. Thus the temporal intensity characteristics of the light at the photomultiplier will be substantially the same when either the leading or trailing edges of the target cross axis A—A.

It is pointed out here than an electronic analysis of the wave signal 73 and comparison of the slopes of the sides 74—76 of the waves 75 are then made by the electronic mechanism connected with the photomultiplier, the result being transmitted to mechanism for controlling the rotation of drive shaft 60 which moves the aperture 52 in whichever direction is necessary to cause the aperture 52 to seek the actual focal point of the lens 70. When the aperture 52 has been so located, it is apparent that the slopes 74—76 of the waves 75 will be substantially equally angled with respect to the zero or base line of the wave signal 73 and thus operation of the mechanism for moving the aperture 52 will cease. At this time the scale 62 will indicate the amount of focal power by which the lens 70 is deficient or the amount it possesses in excess of the desired amount, the operator being able to ascertain from the scale 62 whether or not the lens falls within the tolerances allowable.

Figure 12:
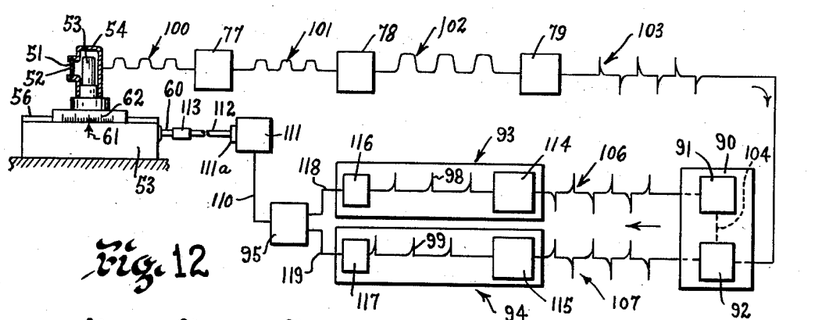
Fig. 12 is a diagrammatic illustration of the progress of a wave signal through the electronic means.
Figure 13:
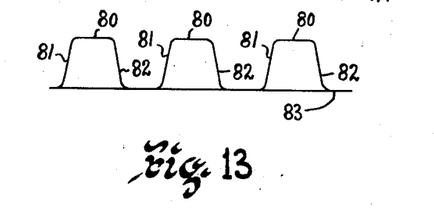
Figs. 13-19 are diagrams illustrating the wave shapes at various stages of the electronic analyzing process.

The electronic means referred to above includes a cathode follower amplifier 77, Figs. 1 and 12, which receives a wave signal 100 directly from the photomultiplier 53. As the signal 100 passes through the cathode follower amplifier 77 the impedance is lowered and the signal, now indicated by numeral 101, is passed on to a two-stage amplifier 78. The waves when seen on an oscillograph screen will be shaped substantially as shown in Fig. 13 if the aperture is at the focal point of the lens under test, but if the aperture is not at the focal point of the lens under test each individual wave of the signal will have one or the other of its sides angled differently with respect to its other side, see Fig. 10. This off position of the aperture may be brought about by an off focus condition of the lens 23 under test with respect to the predetermined test image point or by the off position of the aperture 52 with respect to the actual focal point of the lens under test. The amplifier 78, being a two-stage type, will cause a 360° phase shift of the signal while increasing the output and thus will transmit signal 102 in greatly amplified form to a band pass filter 79.

Figure 14:
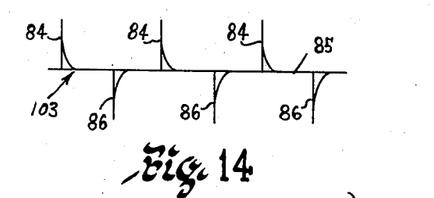

The band pass filter 79 will function to break up each wave into positive and negative pulses corresponding to the leading and trailing sides of the respective waves. The signal 102 going into the band pass filter 79 will be composed of waves 80 (Fig. 13) having leading sides 81 and trailing sides 82 all of which are disposed above or positively with respect to the zero or base line 83 of the signal. The signal 103 coming out of the band pass filter 79, however, will then appear as shown in Fig. 14 wherein each wave of the original signal 102 has been split up so that the leading sides 81 thereof appear in signal 103 as peaks or pulses 84 arranged positively or above the base line 85 while the trailing sides 82 appear as peaks or pulses 86 arranged below or negatively to the base line 85.

Figure 11:
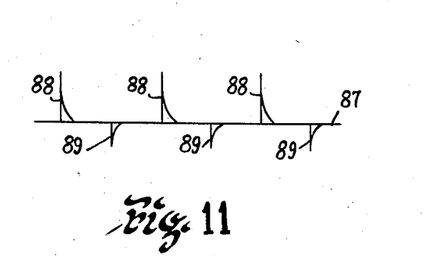
Fig. 11 is a diagram of the split wave shown in Fig. 10.

At this time it is pointed out that the peaks 84 of the signal 103 which correspond to the leading sides 81 of the waves 80 of signal 102 will be of substantially equal length to the peaks 86 which correspond to the trailing sides 82 of signal 102 if the sides 81—82 of the waves 80 are equally sloped, thus indicating that the aperture 52 is located at the focal point of the lens under test. However, if the aperture 52 is located in spaced relation to the focal point of a lens under test, the slopes 81—82 will vary in accordance with the plus or minus condition of the lens. Such a condition would result in the production of a split wave such as seen in Fig. 11 wherein the unequal length of the peaks 88—89 indicate that the aperture is not located at the focal point of the particular lens being tested.

Figure 15:
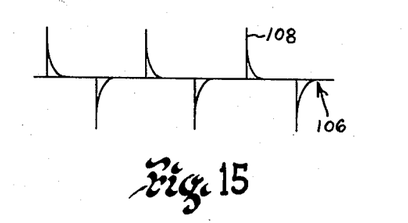
Figure 16:
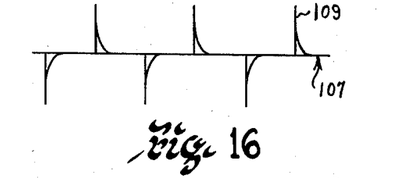
Figure 18:
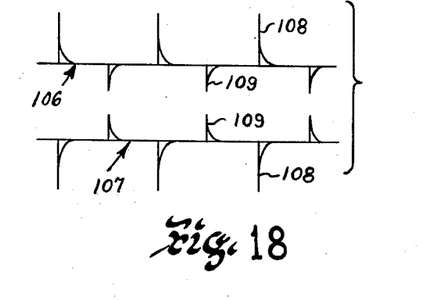
Figure 19:
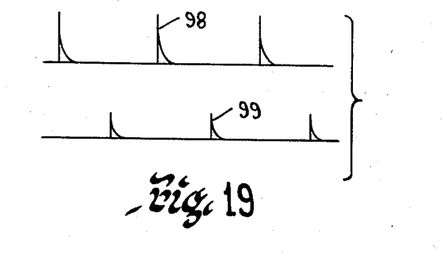

After the waves of the signal produced by the photomultiplier 53 have been analyzed to the extent described above, the leading edge peaks 84 and the trailing edge peaks 86 which extend respectively above and below the zero line 85 (Fig. 14) are electronically compared and the results of the comparison are transmitted to the mechanism for moving the aperture in whichever direction is necessary to locate it at the focal point of the particular lens under test. To accomplish this the split wave 103 (Fig. 12) passes from the band pass filter 79 to a paraphase amplifier 90. In the paraphase amplifier 90 the signal 103 is inverted 180° by a pulse amplifier 92 and comes out as a signal 107 having its positive and negative or leading and trailing edge peaks reversed. A separate signal 104, similar to signal 107, also passes from the pulse amplifier 92 to a phase inverter 91 which again inverts the signal 180°. This signal is thus given a total 360° phase shift which results in the signal 106 coming out of the paraphase amplifier 90 identical to the signal 103 entering the paraphase amplifier 90. Thus, the signal 106 (Figs. 12 and 15) will have the peaks or pulses still arranged in the original positive negative relations while the other signal 107 (Figs. 12 and 16) being inverted, will have the initial trailing edge peaks now arranged positively and the initial leading edge peaks arranged negatively to the zero or base line thereof. It is pointed out here that if the aperture 52 is not located at the focal point of the lens under test, the leading edge or positive peaks 108 in signal 106 (Fig. 18) leaving the paraphase amplifier will be of unequal height with respect to the trailing edge or positive peaks 109 of the other signal 107 leaving the paraphase amplifier.

Figure 17:
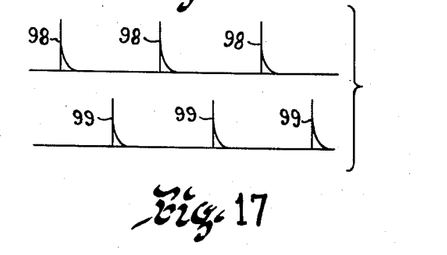

The two signals 106—107 leaving the paraphase amplifier 90 then pass on to respective peak voltmeter circuits 93 and 94. The peak voltmeter circuits each comprise a clipper unit 114 and 115 which clips off either the positive or negative peaks of the respective signals 106 and 107. In the present instance, however, the negative peaks are clipped off thereby causing only the positive peaks to remain. The remaining positive peaks of each signal are directed to respective capacitor-resistors 116 and 117 which function to store up energy and discharge said energy in the form of direct current of a voltage approximately that of the amplitude of said positive peaks 98 and 99 of the respective signals, see Fig. 17, which peaks 98 correspond with the leading edge peaks 108 of signal 106 and are of a height or amplitude in accordance with the degree of slope of the leading sides of the waves 80 of the original signal 102, and which peaks 99 correspond with the trailing edge peaks 109 of the signal 107 and which are of a height or amplitude in accordance with the slopes of the trailing sides of the waves 80 of the original signal 102. The action of the clipper 114 and the capacitor-resistor combination 116 working co-operatively is such as to produce an output D.C. signal 118 in proportion to the amplitude of the positive pulses 98, with the clipper 115 and capacitor-resistor combination 117 functioning similarly whereby signal 107 will result in an output D.C. signal 119 proportionate to the amplitude of pulses 99. If signal 118, with respect to ground or zero level, is more positive than signal 119, the output of the difference amplifier 95 will be the difference between signals 118 and 119, and therefore, signal 110 will transmit this difference from the amplifier 95 to the balancing mechanism 111 which will cause the motor 111a to rotate in one direction. The motor 111a has a drive shaft 112 which is coupled as at 113 to the shaft 60 which operates the mechanism for moving the aperture 52. If signal 119 is greater or more positive than signal 118 with respect to ground or zero level, the motor 111a will consequently rotate in the opposite direction. This rotation of the motor functions to shift the aperture 52 forwardly or rearwardly in accordance with the direction of rotation of the motor and will continue until the signals 118 and 119 are equal. This equalization takes place when the pulses 98 and 99 are of equal value and indicates that the aperture 52 is at the optimum focal point of the rays of light emanating from the lens 23 under test. The scales and indicating means 61 and 62 will indicate the movement of the aperture 52 and whether or not the lens under test is of accurate focal power.

It is apparent that as the aperture 52 approaches the correct focal point of the lens under test, the difference between the slopes of the leading and trailing sides of the square waves will gradually decrease. Then when the aperture 52 is actually positioned at the focal point of the lens under test, the slopes of the sides of the square waves formed as the result of the function of the photomultiplier will be substantially equal and thus the leading edge and trailing edge peaks of the split waves will also be substantially of equal lengths. Therefore, there being no difference in the signals 118 and 119 entering the difference amplifier 95, the balancing system 111 will cease to operate.

The various devices set forth herein are adapted for testing the overall spherical power as well as the meridional focal power of lenses. This is due to the fact that the leading and trailing edges of the occluders 47 (Fig. 2) are arranged to progressively traverse the pinhole 52 in a horizontal direction. It is to be understood that if the lens 23 under test is spherical, its power can be determined by scanning the said lens in the above manner. If the lens is toric, however, it must be so oriented in the lens holding standard 36 that the major meridian to be tested is disposed horizontally. The checking of the opposed major meridian may be accomplished by rotating the lens 90° after checking the first meridian. The above applies to all of the modified structures shown and described herein.

It is also possible to accomplish the same result by first scanning the pinhole 52 in a horizontal direction as shown and described, and thereafter realigning the target 43 with respect to the optical axis of the device so that the leading and trailing edges of the occluders 47 thereof will scan the pinhole 52 in a vertical direction. With this arrangement the lens to be tested is first oriented in the holder so that its major meridians are disposed in the proper horizontal and vertical directions.

It is further pointed out that the power in any other meridian of the lens may be measured by rotating the lens to position the meridians to be measured in the direction of scanning either vertically or horizontally.

Although the foregoing description refers to a device adapted particularly to form so-called "square" waves by means of a movable radial square wave target and a fixed aperture, it is to be understood that a satisfactory electrical signal comprised of waves, either square or otherwise periodic, can be produced in other similar manners, either by providing other forms of periodic or random targets movable with respect to the aperture or by providing a selected fixed target and employing a movable aperture for use therewith.

Figure 20:
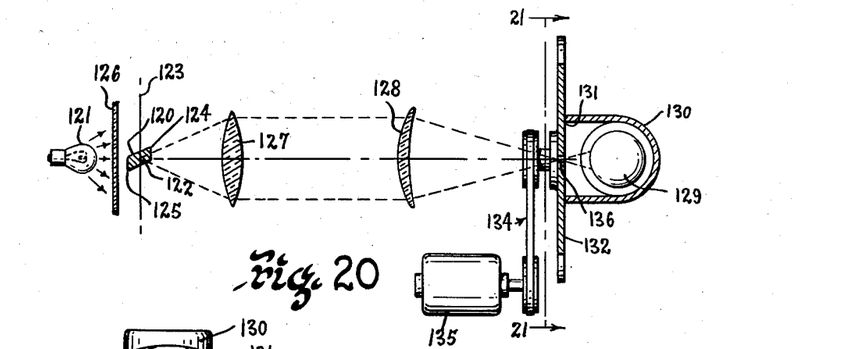
Fig. 20 is a diagrammatic illustration of a modification of the device shown in Fig. 1.
Figure 21:
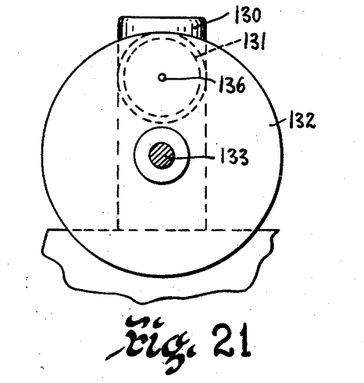
Fig. 21 is a transverse sectional view taken on line 21—21 of Fig. 20.

Fig. 20 illustrates a single bar target 120 which is fixedly positioned before a source of light 121. The optimum object point 122 is located at a point within the target 120 in object plane 123 and the sides of the target 120 are angled with respect to the axis of the device so as to provide a "leading" edge 124 and a "trailing" edge 125 which constitute the two object points which are in spaced relation to optimum object point 122. The light from source 121 is diffused by plate 126 and passes to a collimator lens 127 which functions to send it effectively as parallel rays to the lens 128 under test. The photomultiplier 129 is mounted in a suitable casing 130 which has an opening 131 in its side directed toward the lens 128. Covering the opening 131 is a rotatable scanning member or disc 132, the disc being rotatable on a shaft 133 which is preferably located below or at one side of the opening 131, the shaft 133 being connected by a suitable belt and pulley arrangement 134 to a motor 135. The disc 132 is also provided with an aperture in the form of a pinhole 136 and thus, upon operation of motor 135 and consequent rotation of the disc 132, the aperture 136 will be moved accordingly across the opening 131 in the casing 130 and thus will cause modulation of the light impinging upon the photomultiplier 129. The target 120, being a target "in depth", will function co-operatively with the scanning aperture 136 to vary the intensity of the light as received by the photomultiplier 129 and thus will provide a resultant variation in temporal intensity of the light similarly to the device shown in Fig. 1, the primary difference being that the target 120 in this case is stationary while the aperture 136 is movable.

It is apparent that modifications in the electronic system and in the indicating mechanism can be provided as desired to improve or alter the device; also that other devices can be employed for moving the aperture such as hydraulic, pneumatic or manual controls which can be easily and simply adapted to the apparatus.

Figure 22:
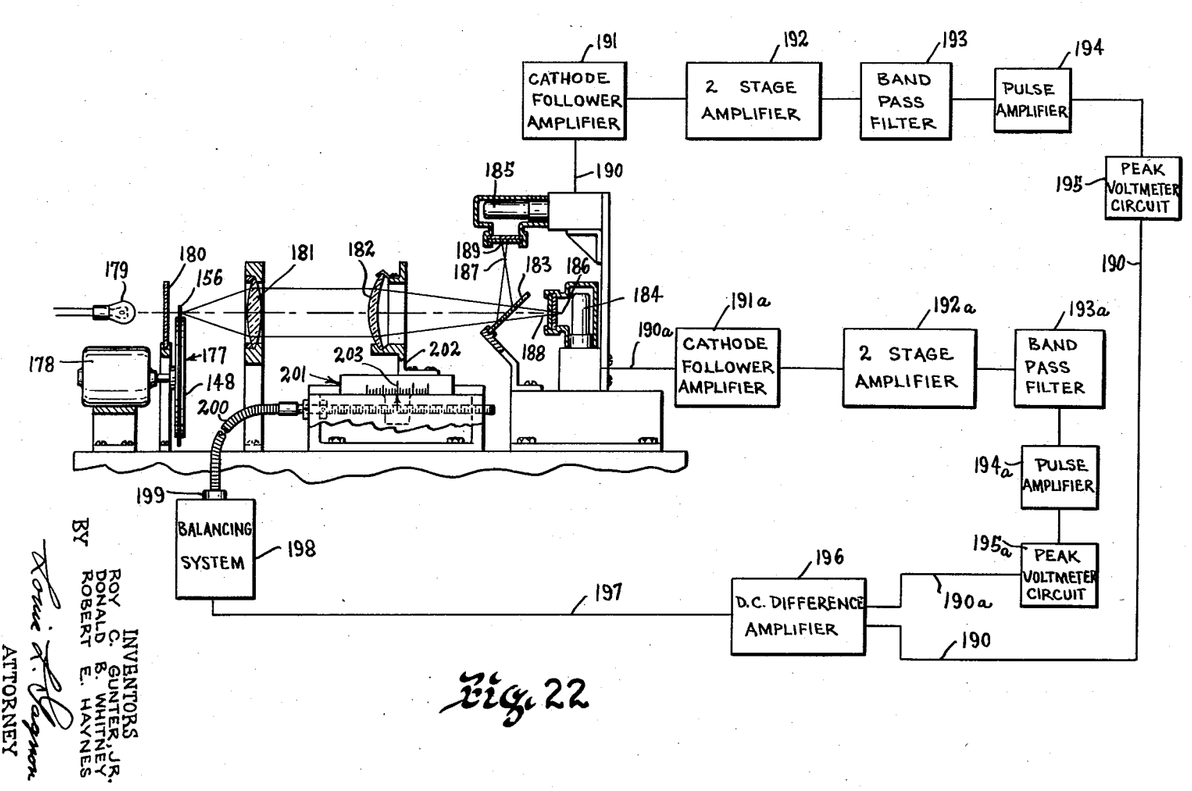
Fig. 22 is a diagrammatic illustration of a modification of the device shown in Fig. 1.
Figure 23:
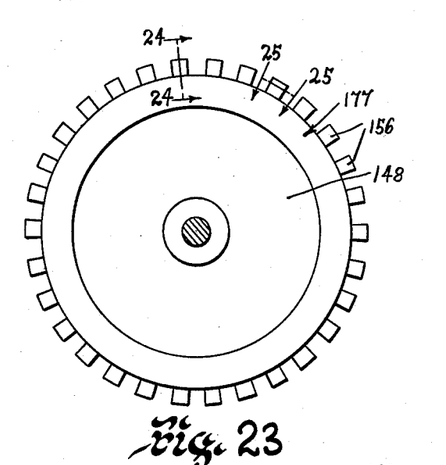
Fig. 23 is an enlarged front elevational view of the target used in the modification of Fig. 22.
Figure 24:
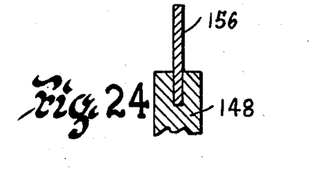
Fig. 24 is an enlarged fragmentary sectional view taken substantially on line 24—24 of Fig. 23.
Figure 25:
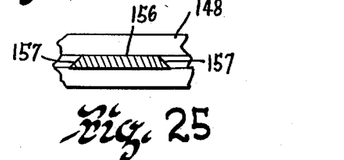
Fig. 25 is an enlarged fragmentary sectional view taken substantially on line 25—25 of Fig. 23 looking in the direction of the arrows.

It is also possible to provide a satisfactorily working device wherein the "depth" factor of the target and aperture combination is accomplished in a different manner. Such a device is illustrated in Fig. 22. In this modification a "flat" target 177 is adapted to be rotated by a motor 178. The target 177 is preferably formed as a disc having a series of flat occluders 156 suitably fixedly positioned throughout its peripheral edge (Figs. 23, 24 and 25). The occluders 156 may be attached to the disc 148 as by being cemented within openings provided therefor on the edge of the disc 148 as shown in Fig. 24 or may be attached if desired as by screws, rivets or the like. As shown in Fig. 25 each of the occluders 156 has its side edges 157 beveled so that the apex of the bevels may be positioned, in the assembled device, in the optimum object plane of the system. Light emanating from a source 179 and passing through a diffusing plate 180 is directed by a collimator lens 181 as effectively parallel rays through a lens 182 under test. From the lens 182 the rays of light are directed to a beam splitter 183 which functions to permit part of the light to pass therethrough toward a photomultiplier 184, while the remainder of the light is reflected to a second photomultiplier 185. Before each of the photomultipliers 184—185 is an aperture 188—189 respectively through which the split beams of light must pass before impinging upon the respective photomultipliers. The focal points as established by the lens 182 are equidistant from the lens; that is, the focal point 186 of the light passing through the beam splitter 183 will be spaced from the lens 182 an equal distance to the spacing of the focal point 187 from the lens of the light reflected toward photomultiplier 185. One of the photomultipliers 184—185, however, is located nearer the beam splitter 183 than is the other and the distance from the lens 182 to the optimum focal point of the system is computed to be substantially one-half of the difference between the two apertures 188—189.

It is apparent that light emitted by source 179 will be modified upon rotation of target 177 and will thus be received by both photomultipliers 184—185 as intermittent flashes. The light actually received by the photomultipliers, however, will be provided with temporal intensity characteristics dependent upon the spacing between the target, lens, and apertures, which temporal intensity characteristics will embody the effect of the focal power of the lens 182 upon the system. If the lens 182 is accurately formed so as to direct the light to the optimum image point of the system, the signals created by both photomultipliers 184—185 will be balanced or electrically identical. However, if the lens 182 is provided with a difference in focal power from that desired, the focal points created thereby will be displaced relative to the optimum focal points of the system. Thus, the temporal intensity of the light reaching the respective photomultipliers will be unequal and the signals created by the respective photomultipliers will be electrically unbalanced. Each photomultiplier transmits a signal 190—190a to respective cathode follower amplifiers 191—191a which function to lower the impedance of the signals whereupon the signals then pass to respective two-stage amplifiers 192—192a which will cause a 360° phase shift of the signals while increasing the output thereof. The amplified signals then pass to respective band pass filters 193—193a which function to break up each wave of the signals into positive and negative pulses having amplitudes which are actually determined by the spacing of the respective apertures 188—189 with respect to the optimum focal point of the system.

From the band pass filters 193—193a the signals pass to respective pulse amplifiers 194—194a where they are amplified before passing to respective peak voltmeter circuits 195—195a. In the peak voltmeter circuits 195—195a the signals are clipped and otherwise treated similarly to the signals 106 and 107 which enter the peak voltmeter circuits 93—94 of the device illustrated in Fig. 1. The clipped signals then are passed to a D.C. difference amplifier 196 which functions to transmit the difference between the signals as an output signal 197 to a balancing system 198. This will cause a motor 199 to rotate in a selected direction in accordance with the difference in the signals 190 as determined by the difference amplifier 196. The motor is connected as by a drive shaft 200 to a longitudinally movable slide mechanism 201 which is generally similar to the mechanism shown in Fig. 1. On the slide mechanism 201, however, is mounted a support 202 which carries the lens 182 under test. Thus, when the signal 197 is transmitted to the balancing system 198, consequent rotation of motor 199 and drive shaft 200 will cause the lens 182 to be moved along the axis of the optical system. Such movement of the lens 182 will consequently cause variation in the locations of the focal points 186—187 with respect to the apertures 188—189. When the focal points 186—187 are equally spaced with respect to the apertures 188—189 this is indication that the system is balanced. At this time the square wave signals 190 will be electrically equivalent and thus no difference between the signals will be evidenced at the difference amplifier 196. Consequently no signal will be submitted to the balancing system 198 and, therefor, the balancing system will not operate. Scales 203 on the slide mechanism 201 will function to indicate the extent of adjustment of the lens, which indication will convey to the operator of the device the exact focal power of the lens 182.

Figure 26:
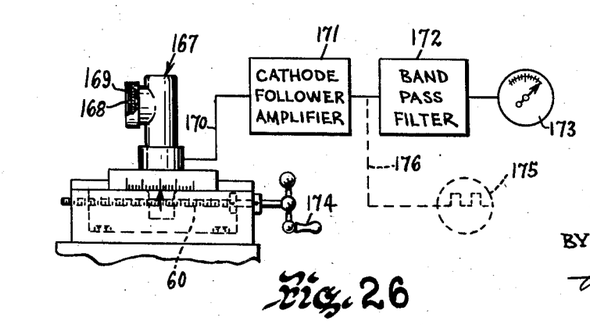
Fig. 26 is a diagrammatic illustration of a further modification of the device shown in Fig. 1.

It is also possible to provide other satisfactorily working devices wherein the "depth" factor of the target and aperture combination is accomplished in a different manner. Such devices are shown in Fig. 26 wherein a photomultiplier indicated generally by numeral 167 is adapted to receive light in a system which employs a "flat" target of relatively high spatial frequency. In this instance, however, the aperture 168 will be provided in a relatively thin disc member 169 which is carried by the casing of the photomultiplier. The signal 170 formed by the photomultiplier in this case will consist of square waves wherein the sides of each individual wave will be equally sloped with respect to one another. If the aperture 168 is located at the optimum image point each wave of the signal will be substantially square. However, if the aperture is displaced with respect to the optimum image point the sides of each wave of the signal will be sloped to a degree determined by the amount of such displacement. The signal 170 is transmitted to a cathode follower amplifier 171 where the impedance is lowered and then passes to a band pass filter 172 which functions to break up each of the square waves into positive and negative pulses wherein the pulses will be of amplitudes determined by the angle of slope of the sides of the square waves of signal 170. From the band pass filter, the signal is transmitted to a peak-to-peak reading gauge or meter 173 which indicates best focus at maximum reading of the meter and which visually indicates the sum of the amplitude of the pulses of the signal as determined by the particular location of the aperture with respect to the optimum image point of the lens under test. The aperture is then moved to the extent necessary to locate it at said optimum image point which will thus cause the square waves of the signal to become more normal with respect to the zero or base line of the signal. This will cause the pulses of the signal leaving the band pass filter 172 to have maximum amplitudes. The meter 173 is provided with an indication of the maximum amplitude and thus an operator will merely cause the aperture to be moved to the position wherein the maximum amplitude indication on the meter 173 will be indicated.

In a device of this type the aperture can be manually moved by a hand crank 174 which is connected directly to drive shaft 60. Other means of indication are feasible such as a meter which responds only to positive pulses or only to negative pulses in either case of which maximum reading will again indicate best focus or an averaging type meter which would read minimum for best focus, etc.

If desired, an oscillograph 175 can be adapted to receive a signal 176 leaving the cathode follower amplifier 171 to visually record the shapes of the waves of the signal substantially as indicated by dotted lines in Fig. 26. In this type of device it will be necessary for the operator to move the aperture 168 manually by operation of crank 174 to a position wherein the edges or sides of the waves appearing on the oscillograph 175 appear to be most nearly vertical with respect to the base line of the signal.

From the foregoing description, it will be apparent that all of the objects and advantages of the invention have been accomplished to provide novel means and method for testing individual lenses or combinations of lenses to determine their optical characteristics such as focal power.

It will also be apparent that many changes may be made in the details of construction and arrangement of parts shown and described without departing from the spirit of the invention as expressed in the accompanying claims. Therefore, it is to be understood that all material set forth or shown in the accompanying drawings is to be interpreted as illustrative and not in a limiting sense.

We claim:

1. A device for determining the optical characteristics of a lens comprising an optical system having means for projecting light from a source of illumination through a lens under test, photosensitive means optically aligned with said light, apertured means located at a given position between said lens under test and said photosensitive means, means positioned between said source of illumination and said lens under test for interrupting the light at a controlled plurality of spaced intervals and for producing a pair of alternately existing images focused substantially in the plane of said apertured means for introducing spatial intensity characteristics in said light as received by said photosensitive means, means for effectively scanning said means for interrupting the light to add temporal intensity variations to said spatial intensity characteristics and which may be converted by said photosensitive means into an electrical signal having a pair of readily interpretable portions each characterized by the related existing locations of said images relative to the apertured means and each having temporal amplitude variations directly related to the temporal intensity variations of the light as received by said photosensitive device, means for amplifying said signal, means associated with said amplifying means for converting said portions of said signal into a first pulsating signal embodying positive and negative pulses controlled according to the characteristics of said temporal amplitude variations, dividing means associated with said converting means for dividing said first pulsating signal into a pair of signals each similar in character to said first-mentioned pulsating signal and further embodying inverting means through which one of said pair of signals is inverted, clipper means associated with said dividing means for eliminating either the positive or negative peaks of the respective pair of signals, converting means associated with said clipper means for converting each of said signals into a source of current capable of operating motor-driven mechanism, interpreting means associated with said converting means for interpreting means associated with said converting means for interpreting any existing difference in said pair of signals as received from said converting means, balancing means associated with said interpreting means and embodying motor-driven mechanism for shifting the lens under test and the photosensitive means relative to each other an amount sufficient to compensate for the difference in said pair of signals.

2. A device for determining the optical characteristics of a lens comprising an optical system having means for projecting light from a source of illumination through a lens under test, photosensitive means optically aligned with the projected light of said optical system and adapted to receive the light after passing through said lens under test, means positioned in said projected light between said lens under test and said source of illumination which interrupts the light at spaced intervals in a plane perpendicular to the path of light for causing said light to be focused at spaced points in said optical system and to introduce spatial intensity characteristics in said light as received by said photosensitive means, means for effectively scanning said means for interrupting the light to add temporal variations to said spatial intensity characteristics and which are such that they may be converted by said photosensitive means into an electrical signal having a pair of readily interpretable portions each characterized by the locations of said spaced points and having temporal amplitude variations directly related to the temporal variations of the light as received by said photosensitive means, means for amplifying said signal, means associated with said amplifying means for converting said portions of said signal into a first pulsating signal embodying positive and negative pulses controlled according to the characteristics of said temporal amplitude variations, dividing means associated with said converting means for dividing said first pulsating signal into a pair of signals each similar in character to said first-mentioned pulsating signal and further embodying inverting means through which one of said pair of signals is inverted, clipper means associated with said dividing means for eliminating either the positive or negative peaks of the respective pair of signals, converting means associated with said clipper means for converting each of said signals into separate sources of direct current each of said sources of direct current being proportional to the amplitude of a respective one of said signals, said sources of direct current being capable of operating motor-driven mechanism, interpreting means associated with said converting means for interpreting any existing difference between said separate sources of direct current as received from said converting means, balancing means associated with said interpreting means and embodying motor-driven mechanism for shifting the lens under test and the photosensitive means relative to each other an amount sufficient to compensate for the difference in each of said separate sources of direct current.

3. A device for determining the optical characteristics of a lens comprising an optical system having means for projecting light along a predetermined optical axis from a source of illumination through a lens under test when said lens is aligned with said optical axis, photosensitive means axially aligned with the projected light of said optical system and adapted to receive the light after passing through said lens under test, means positioned in said projected light between said lens under test and said source of illumination which in a continuous progressive sequence of movement of said means produces successive intermittent uniform interruptions of the light alternately first in one plane perpendicular to the path of light and then in a second plane perpendicular to said path of light and axially spaced from said first mentioned plane during said sequence of movement for causing said light to be alternately focussed at axially spaced points in said optical system adjacent said photosensitive means and to introduce uniformly controlled spatial intensity characteristics in said light passing through the lens under test whereby said spatial intensity characteristics of the light at said axially spaced points and as received by the photosensitive means after passing through the lens under test will be modified in accordance with the optical characteristics of said lens, means for effectively scanning said means for interrupting the light to add electronically interpretable charactaristics to said spatial intensity characteristics in the form of temporal variations of the light whereby the mentioned modifications of said spatial intensity characteristics at said spaced points may be converted by said photosensitive means into an electrical signal having a pair of readily electronically interpretable portions each characterized by the locations of said spaced points and having temporal amplitude variations directly proportional to said spatial intensity characteristics of the light as received by said photosensitive means and interpreting means connected with said photosensitive means for differentiating said temporal amplitude variations.

4. A device for determining the optical characterisitics of a lens comprising means for projecting a beam of light from a source of illumination along a given optical path, a photosensitive device optically aligned with said beam of light, means for supporting a lens to be tested in said beam of light, means positioned in said beam of light between said lens and said source of illumination which in a continuous progressive sequence of movement of said means produces successive intermittent uniform interruptions of the light at a controlled plurality of spaced intervals alternately on opposite sides of a plane perpendicular to the path of light whereupon the spatially interrupted light when passed through the lens will produce a pair of alternately existing spaced image points along said given optical path, said image points each embodying the particular spatial intensity characteristics introduced therein by the lens under test and when said image points are located at substantially the same distance on opposite sides of a preselected plane intersecting the optical path and located at a given position forwardly of the photosensitive device, the spatial intensity characteristics of the light at said image points will be of substantially equal value as received by said photosensitive device, means for effectively scanning said means for interrupting the light to add electronically interpretable characteristics in the form of temporal intensity variations of the light to said spatial intensity characteristics thereof, said temporal intensity characteristics being readily converted by said photosensitive device into an electrical signal having a pair of readily interpretable portions each characterized by the optical characteristics of the lens under test and its particular location along said given optical path and the related location of said spaced image points relative to said preselected plane intersecting said given optical path, each of said interpretable portions having temporal amplitude variations directly proportional to the spatial intensity variations of the light as received by said photosensitive device and interpreting means connected with said photosensitive device for interpreting and differentiating any existing variations of temporal amplitude in said interpretable portions as result from deviation of said equal image distances from said preselected plane.

5. A device for determining the optical characteristics of a lens comprising an optical system having means for projecting light from a source of illumination along a common axis through a lens under test, photosensitive means optically aligned with the projected light of said optical system and adapted to receive the light after passing through said lens under test, means positioned in a plane perpendicular to and intersecting said path of projected light and located between said lens under test and said source of illumination which successively, alternately interrupts the light uniformly in a continuous progressive sequence first in one plane perpendicular to said axis and then in another plane perpendicular to said axis at spaced intervals for causing said light when passed through the lens under test to be focussed at spaced points on said axis adjacent said photosensitive means in said optical system and to simultaneously introduce spatial intensity characteristics in said light, said spatial intensity characteristics of the light being modified, at said spaced points and as received by said photosensitive means, by the particular optical characteristics and existing location of the lens under test in said optical system, said means for interrupting the light further functioning to add electronically interpretable characteristics to said spatial intensity characteristics in the form of temporal variations which are directly related to said spatial intensity characteristics as received by the photosensitive means and are such that they may be converted by said photosensitive means into a single electrical signal having a pair of readily electronically intepretable portions each characterized by the locations of said spaced points relative to said photosensitive means and having temporal amplitude variations directly related to the temporal variations of the light as received by said photosensitive means, means for amplifying the temporal amplitude variations, means associated with said amplifying means for converting said temporal amplitude variations into positive and negative pulses controlled according to the characteristics of said temporal amplitude variations, means associated with said converting means for dividing said signal into two signals having similar characteristics and means including motor-driven mechanism connected with said converting means and responsive to any existing differences in said two signals for adjusting the photosensitive means and lens under test relative to each other by an amount sufficient to compensate for said difference.

6. The method of determining the optical characteristics of a lens system comprising optically projecting light from a source of illumination through said lens system, providing means in alignment with and responsive to light for converting said light into electrical energy, placing image-forming means in said projected light adjacent said source of illumination for projection through said lens system to produce a pair of spaced images, which for a lens system of accurate power, will focus said images with respect to said means responsive to light in such manner as to cause both of said images to be of substantially equal intensity as received by said means responsive to said light, providing scanning means for successively, alternately causing first one and then the other of said pair of images to be received by said means responsive to light and for simultaneously introducing given spatial intensity characteristics in said light producing said images, said spatial intensity characteristics of the light at said images being modified in accordance with the optical characteristics of said optical system, said scanning means being adapted to add temporal intensity characteristics to said spatial intensity characteristics of the light as received by said means responsive to light to cause said means responsive to light to function and electronically convert said modified spatial intensity characteristics into an electrical signal embodying a pair of components each characterized by the related positioning of the related spaced images with said means responsive to light, and interpreting any existing differences in said components as altered by any deviation in the equal intensity of said images as received by the means responsive to light as brought about by the optical characteristics of said lens system.

7. The method of determining the optical characteristics of a lens comprising providing a system for optically projecting a beam of light from a source of illumination along a given path, positioning a lens under test in said path, providing target means for introducing spatial intensity characteristics in said light when projected through said lens under test whereby said spatial intensity characteristics will be modified by said lens in accordance with the optical characteristics thereof and simultaneously causing said spatially modified light, after passing through said lens under test, to be successively, alternately imaged at first one and then another of a pair of spaced locations in said given path, and further causing said locations to be spaced a given distance relative to each other, positioning apertured means in said path at a point adjacent said locations, further positioning photosensitive means adjacent said apertured means to receive light from said locations through said apertured means, scanning said target means with said apertured means to add temporal intensity characteristics to said spatial intensity characteristics of the light to provide means for causing said photosensitive means to function and thereby electronically convert said modified spatial intensity characteristics into an electrical signal having temporal amplitude characteristics of a magnitude proportionate to said modified spatial intensity characteristics and in a form embodying two components which vary in character in accordance with the related positioning of said pair of spaced locations and said apertured means, electrically interpreting said signal and discriminating between the temporal amplitude characteristics of each of said components of the signal, electrically converting any existing difference in the temporal amplitude characteristics of each of said components into a source of direct current electrical energy capable of energizing and operating motor-drive mechanism, providing means for causing the operation of said motor-drive mechanism to adjust the related positions of said apertured means and said lens under test.

8. The method of determining the optical characteristics of a lens comprising providing a system for optically projecting light from a source of illumination through a lens under test, providing means for introducing given spatial intensity characteristics in said light when projected through said lens whereby said spatial intensity characteristics will be modified by said lens in accordance with the optical characteristics thereof, causing said light to be successively, alternately focussed by said lens under test at first one and then another of a pair of spaced points located at predetermined related positions in said system, positioning photosensitive means in optical alignment with said light and adjacent said spaced points for receiving the spatially modified light from each of said spaced points, adding temporal intensity characteristics to said spatial intensity characteristics of the light to provide means for causing said photosensitive means to electronically convert said spatial intensity characteristics into temporal amplitude characteristics in the form of an electrical signal being proportionate in magnitude to said modified spatial intensity characteristics of the light as received by said photosensitive means from said spaced points, interpreting any existing differences in said temporal amplitude characteristics as result from similar differences in said temporal intensity characteristics as received by said photosensitive means which occur when said spaced points are located at other than said predetermined points.

References Cited in the file of this patent

UNITED STATES PATENTS

| | | |
|---|---|---|
| 2,164,576 | Collins | July 4, 1939 |
| 2,254,548 | Ruhle et al. | Sept. 2, 1941 |
| 2,385,503 | Glasser | Sept. 25, 1945 |
| 2,524,807 | Kallman | Oct. 10, 1950 |
| 2,625,072 | Clark et al. | Jan. 13, 1953 |

FOREIGN PATENTS

| | | |
|---|---|---|
| 644,711 | Great Britain | Oct. 18, 1950 |

OTHER REFERENCES

J.O.S.A. by Herriott, A Photoelectric Lens Bench, vol. 37, June 1947, pages 472–474.